United States Patent
Yan et al.

(10) Patent No.: US 10,310,117 B2
(45) Date of Patent: Jun. 4, 2019

(54) EFFICIENT SEISMIC ATTRIBUTE GATHER GENERATION WITH DATA SYNTHESIS AND EXPECTATION METHOD

(71) Applicants: Jia Yan, Houston, TX (US); John E. Anderson, Conroe, TX (US); Rongrong Lu, The Woodlands, TX (US); Carey M. Marcinkovich, The Woodlands, TX (US)

(72) Inventors: Jia Yan, Houston, TX (US); John E. Anderson, Conroe, TX (US); Rongrong Lu, The Woodlands, TX (US); Carey M. Marcinkovich, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 215 days.

(21) Appl. No.: 15/407,279

(22) Filed: Jan. 17, 2017

(65) Prior Publication Data

US 2017/0219729 A1   Aug. 3, 2017

Related U.S. Application Data

(60) Provisional application No. 62/290,803, filed on Feb. 3, 2016.

(51) Int. Cl.
| | | |
|---|---|---|
| *G01V 1/30* | (2006.01) | |
| *G01V 1/28* | (2006.01) | |
| *G01V 1/36* | (2006.01) | |
| *E21B 49/00* | (2006.01) | |

(52) U.S. Cl.
CPC .............. *G01V 1/307* (2013.01); *E21B 49/00* (2013.01); *G01V 1/282* (2013.01); *G01V 1/303* (2013.01); *G01V 1/362* (2013.01); *G01V 2210/512* (2013.01); *G01V 2210/614* (2013.01); *G01V 2210/632* (2013.01); *G01V 2210/679* (2013.01)

(58) Field of Classification Search
CPC ........ G01V 1/303; G01V 1/307; G01V 1/282; G01V 1/362; G01V 2210/632; G01V 2210/614; G01V 2210/512; G01V 2210/679; E21B 49/00
USPC .......................................................... 367/73
See application file for complete search history.

(56) References Cited

U.S. PATENT DOCUMENTS

| | | | |
|---|---|---|---|
| 6,049,759 | A | 4/2000 | Etgen |
| 6,819,628 | B2 | 11/2004 | Tal-Ezer |
| 6,996,470 | B2 | 2/2006 | Kamps |
| 7,082,367 | B2 | 7/2006 | Bankhead et al. |
| 7,117,093 | B2 | 10/2006 | Stinson et al. |
| 8,612,156 | B2 | 12/2013 | Gulati |
| 8,619,498 | B2 | 12/2013 | Xu et al. |

(Continued)

OTHER PUBLICATIONS

Giboli, M. et al. (2012) "Reverse Time Migration Surface Offset Gathers Part 1: A New Method to Produce 'Classical' Common Image Gathers," *SEG, 2012 Annual Meeting*, Las Vegas, Nevada, 5 pages.

(Continued)

*Primary Examiner* — Daniel L Murphy
(74) *Attorney, Agent, or Firm* — ExxonMobil Upstream Research Company-Law Department

(57) ABSTRACT

A method for generating seismic attribute gathers, the method including: computing, with a computer, seismic images with a field dataset; generating, with a computer, synthetic data corresponding to the seismic images; computing, with a computer, an attribute volume by applying an expectation method to the synthetic data; mapping, with a computer, the attribute volume to the seismic images; and generating, with a computer, seismic attribute gathers by stacking the seismic images mapped to the attribute volume.

16 Claims, 5 Drawing Sheets

(56) References Cited

U.S. PATENT DOCUMENTS

| | | |
|---|---|---|
| 9,063,245 B2 | 6/2015 | Lu |
| 9,069,100 B2 | 6/2015 | Kolbjornsen et al. |
| 9,250,341 B2 | 2/2016 | Tang et al. |
| 2005/0197779 A1 | 9/2005 | Stinson et al. |
| 2011/0218737 A1 | 9/2011 | Gulati |
| 2012/0316850 A1 | 12/2012 | Liu et al. |
| 2014/0133275 A1 | 5/2014 | Guan et al. ............ 367/53 |
| 2014/0149046 A1 | 5/2014 | Baina et al. |
| 2014/0200813 A1 | 7/2014 | Montel et al. |
| 2014/0328140 A1 | 11/2014 | Khalil et al. |
| 2015/0066458 A1 | 3/2015 | Coles et al. |

OTHER PUBLICATIONS

Giboli, M. et al. (2014) "Pre-Salt Imaging Offshore West Africa: The Value of Using Surface Offset Gathers from Wave-Equation Migration in Area of Complex Geology," *EAGE/SPE Workshop on Subsalt Imaging*, SS25, Limassol, Cyprus, Feb. 16-19, 2014, 4 pages.

Montel, J. P. (2014) "Surface-Offset RTM Gathers—What Happens when the Velocity is Wrong," $76^{th}$ *EAGE Conf.*, Amsterdam RAI, Netherlands, Jun. 16-19, 2014, 5 pages.

Zhang, Y. et al. (2007) "True-Amplitude, Angle-Domain, Common-Image Gathers from One-Way Wave-Equation Migrations," *Geophysics*, vol. 72, No. 1, Jan.-Feb. 2007, pp. S49-S58.

Bleistein, N. (1987) "On the imaging of reflectors in the earth," *Geophysics*, vol. 52, No. 7, Jul. 1987, pp. 931-942;

Etgen, J. (2012) "3D Wave Equation Kirchhoff Migration," *SEG 2012 Annual Meeting Conference Proceedings*, pp. 1-5.

Santos et al., (1997) "Modeling by Demigration", *SEG Technical Program Expanded Abstracts*, 1997, pp. 1909-1912.

Expectation method reference for quantum mechanics https://en.wikibooks.org/wiki/Quantum_Mechanics/Operators_and_Commutators Retrieved from the internet Jan. 12, 2017.

EFFICIENT SEISMIC ATTRIBUTE GATHER GENERATION WITH DATA SYNTHESIS AND EXPECTATION METHOD

CROSS-REFERENCE TO RELATED APPLICATION

This application claims the benefit of U.S. Provisional Patent Application 62/290,803 filed Feb. 3, 2016 entitled efficient SEISMIC ATTRIBUTE GATHER GENERATION WITH DATA SYNTHESIS AND EXPECTATION METHOD, the entirety of which is incorporated by reference herein.

FIELD OF THE INVENTION

Exemplary embodiments described herein generally pertain to the field of geophysical prospecting, and more particularly to generating attribute gathers.

BACKGROUND

This section is intended to introduce various aspects of the art, which may be associated with the present technological advancement. This discussion is believed to assist in providing a framework to facilitate a better understanding of particular aspects of the present technological advancement. Accordingly, it should be understood that this section should be read in this light, and not necessarily as admissions of prior art.

In the oil and gas industry, seismic prospecting techniques are commonly used to aid in the search for and evaluation of subterranean hydrocarbon deposits. A seismic prospecting operation consists of three separate stages: data acquisition, data processing, and data interpretation.

In the data acquisition stage, a seismic source is used to generate a physical impulse known as a "seismic signal" that propagates into the earth and is at least partially reflected by subsurface seismic reflectors (i.e., interfaces between underground formations having different acoustic impedances). The reflected signals (known as "seismic reflections") are detected and recorded by an array of seismic receivers located at or near the surface of the Earth, in an overlying body of water, or at known depths in boreholes. The seismic energy recorded by each seismic receiver is known as a "seismic data trace."

During the data processing stage, the raw seismic data traces recorded in the data acquisition stage are refined and enhanced using a variety of procedures that depend on the nature of the geologic structure being investigated and on the characteristics of the raw data traces themselves. In general, the purpose of the data processing stage is to produce an image of the subsurface geologic structure from the recorded seismic data for use during the data interpretation stage. The image is developed using theoretical and empirical models of the manner in which the seismic signals are transmitted into the Earth, attenuated by the subsurface strata, and reflected from the geologic structures. The quality of the final product of the data processing stage is heavily dependent on the accuracy of the procedures used to process the data.

The purpose of the data interpretation stage is to determine information about the subsurface geology of the earth from the processed seismic data. For example, data interpretation may be used to determine the general geologic structure of a subsurface region, or to locate potential hydrocarbon reservoirs, or to guide the development of an already discovered reservoir. Obviously, the data interpretation stage cannot be successful unless the processed seismic data provide an accurate representation of the subsurface geology.

In complex geological environments, wave equation migration is recognized to be a good imaging technique currently available for imaging seismic data. Wave equation migration comes in two forms usually called WEM and RTM. In WEM ("Wave Equation Migration"), energy is back propagated from the receivers using a one-way wave equation, and forward propagated from the corresponding source. The wave fields are cross correlated at each image point to create the subsurface seismic image. This method can produce good images for reflectors whose dip is relatively shallow. In RTM ("Reverse Time Migration"), the wave field at the receivers is back-propagated using a two-way wave equation, and is cross correlated with energy forward propagated from the source. This method can produce good images at all reflector dips, but is more expensive than WEM by a factor typically in the range of 4-10.

Ray-based and wave-based imaging algorithms are often both used for a depth imaging project. A typical ray-based method, such as Kirchhoff migration, is almost always used because of its efficiency and flexibility in forming surface-offset gathers, which are subsequently used for driving tomography or image enhancement. On the other hand, wave-based methods, such as reverse time depth migration (RTM) and one-way wave equation migration (WEM), are frequently used for imaging complex geology. However, wave-based imaging algorithms suffer from inefficiencies associated with forming attribute gathers, such as surface-offset gathers, commonly used for evaluating and updating a migration velocity model because the surface-offset attribute gets mixed and lost during shot record migration.

One expensive way to generate wave-equation based surface offset gathers is to migrate the data bin by bin. This method, due to its huge cost, is hereby referred to as the brute force method. The brute force method involves splitting the seismic data into numbers of offset bins. Then each bin of data is carried through the migration engine. The computation cost is proportional to the number of offset bins desired, which is usually in the orders of 20-30 for wide azimuth data or 80-100 for narrow azimuth data. This method generates the most accurate surface offset gathers at huge computational cost (see reference 1 below).

An inexpensive way to estimate a data attribute, such as surface-offset distance between the source and receiver for RTM and WEM, is the so-called expectation method (see references 2 and 3 below).

The expectation method generally works as follows:
1. Denote the original data as "data 0";
2. Weight "data 0" by a desired attribute to define "data 1";
3. Migrate "data 0" and "data 1" separately to obtain "image 0" and "image 1" respectively; and
4. In the image domain, divide "image 1" by "image 0" to obtain an estimate of the desired attribute at each location in the image with regularization to avoid division by very small values.

However, this expectation method suffers from several drawbacks. The method is single-valued. If the data includes multiple reflections or other types of coherent noise, the estimated attribute is going to be biased toward the value appropriate for larger amplitude events, which may or may not be the desired event. The larger amplitude events could be events associated with multiple reflections rather than more desirable primary reflection events. The method for an attribute, such as surface-offset distance, is influenced by the surface-geometry irregularity. Therefore, if no regularized shots are available, an inaccurate estimate of the surface is obtained.

The following references, which are discussed herein, are hereby incorporated by reference in their entirety:

Reference 1—J. Etgen, "3D Wave Equation Kirchhoff Migration," SEG 2012 Annual Meeting Conference Proceedings, pp. 1-5;

Reference 2—U.S. Patent Publication 2014/0149046;

Reference 3—N. Bleistein, "On the imaging of reflectors in the earth," Geophysics, Vol. 52, No. 7, July 1987, pp. 931-942; and Reference 4—Santos et al., "*Modeling by demigration*," SEG Technical Program Expanded Abstracts, 1997, pp. 1909-1912.

SUMMARY

A method for generating seismic attribute gathers, the method including: computing, with a computer, seismic images with a field dataset; generating, with a computer, synthetic data corresponding to the seismic images; computing, with a computer, an attribute volume by applying an expectation method to the synthetic data; mapping, with a computer, the attribute volume to the seismic images; and generating, with a computer, seismic attribute gathers by stacking the seismic images mapped to the attribute volume.

In the method, the computing seismic images further includes: dividing the field dataset into bins, wherein binned data have similar values of an attribute; performing seismic imaging for the binned data using a known Earth model and one of Kirchhoff migration, one-way wave equation migration, or reverse time migration; and forming a subsurface Earth image by summing outputs from the seismic imaging of the binned data.

In the method, the attribute is surface offset.

In the method, the synthetic data is generated using a reflectivity model.

In the method, the reflectivity model is generated using seismic interpretation software.

In the method, the reflectivity model is generated by a computerized painting or picking program.

The method can include using a dip field to populate the reflectivity model.

In the method, the synthetic data is generated using a prestack demigration process.

In the method, the synthetic data is based on an acquisition geometry substantially similar to that of the field dataset set in both surface density and time sampling.

In the method, the synthetic data has a sparser surface acquisition geometry and time sampling than the field dataset.

In the method, the synthetic data has a regular acquisition pattern.

In the method, the synthetic data has an irregular acquisition pattern.

In the method, the synthetic data has a substantially similar acquisition area relative to the field dataset.

In the method, the synthetic data has a wider acquisition area relative to the field dataset.

In the method, the mapping the seismic images to bins using the attribute volume, wherein the bins define attribute values.

In the method, the computing an attribute volume by applying the expectation method to the synthetic data includes: applying a migration process to the synthetic data to generate a subsurface image volume; applying a migration process to the synthetic data, wherein seismic traces of the synthetic data are weighted by multiplying the seismic traces by a function of a value of an attribute, and generating an attribute weighted subsurface image volume; and computing the attribute volume by applying a division process to the subsurface image volume and the attribute weighted subsurface image volume.

The method further includes using the seismic attribute gathers to improve a velocity model, using the improved velocity model to generate a subsurface image, and extracting hydrocarbons from a location determined at least in part from the subsurface image.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present technological advancement. Moreover, certain dimensions may be exaggerated to help visually convey such principles.

DETAILED DESCRIPTION

Figure 1:
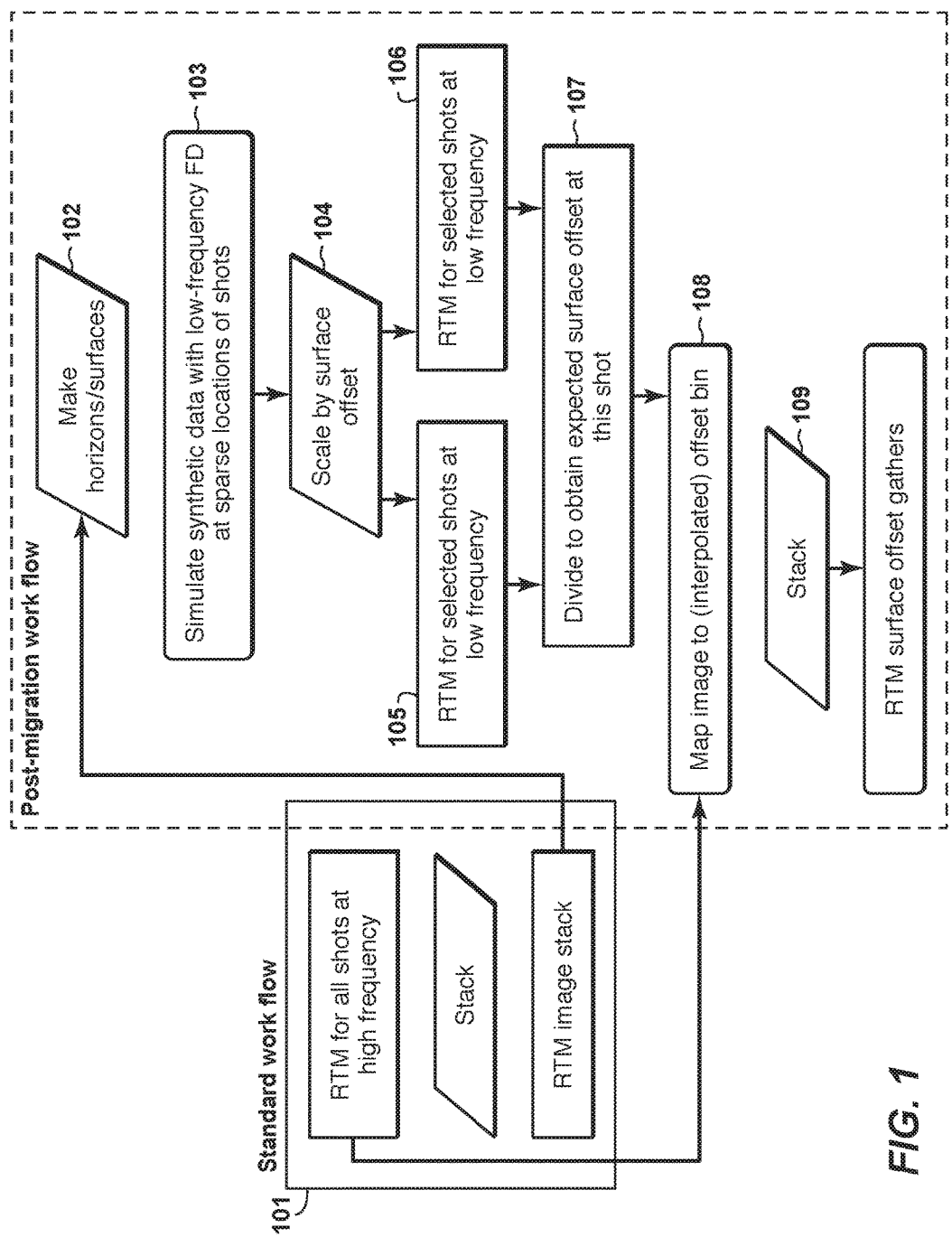
FIG. 1 illustrates an exemplary method of obtaining surface attribute gathers.

Exemplary embodiments are described herein. However, to the extent that the following description is specific to a particular embodiment, this is intended to be for exemplary purposes only and simply provides a description of the exemplary embodiments. Accordingly, the present technological advancement is not limited to the specific embodiments described below, but rather, it includes all alternatives, modifications, and equivalents falling within the true spirit and scope of the appended claims.

Offset gathers can be useful in interpretation of the seismic images and also in velocity analysis. As discussed in more detail below, the present technological advancement can use the expectation method to estimate approximate surface-offset gathers from RTM or WEM. The data attribute of interest can come from acquisition geometry information associated with the seismic data. Accordingly, offset is one of many attributes useable with the present technological advancement.

In an exemplary method, seismic attribute gathers are generated by computing seismic images using a field data set; synthesize synthetic data using an Earth model generated from the seismic images; using the expectation method to generate volume attributes from the synthetic data; mapping the seismic images to appropriate attribute values; and creating seismic attribute gathers by stacking the results of the mapping.

Offset refers to the horizontal distance from source to receiver. A common offset gather refers to seismic traces that have the same offset. The more general phrase "seismic attribute gather" is a gather of seismic traces that share an attribute, common offset being one example of such an attribute. Attribute refers to a measurable property of seismic data or acquisition geometry. A gather refers to a display of seismic traces that share an acquisition attribute, such as a common offset gather. Field dataset refers to real data that was generated through activation of sources and the corresponding recording of the reflections by a receiver. Synthetic data refers to the results of one of many forms of forward modeling to predict seismic responses of the Earth. "Substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context.

To circumvent the drawbacks mentioned in the background section, a new method for estimating desired data attributes associated with an image location is described herein. An exemplary implementation of the present technological advancement can include separating an image attribute with field datasets. The former is smooth, slowly varying and the latter is high-frequency, and rapidly varying. The separation allows one to obtain surface attribute (e.g. offset) gathers more accurately and efficiently.

FIG. 1 illustrates an exemplary method of obtaining surface attribute gathers. Step 101 includes a conventional reverse time migration (RTM) work flow, with substeps of performing RTM for all shots at a high frequency, stacking (to sum traces), and generating an RTM image stack (e.g., an image volume).

Figure 2:
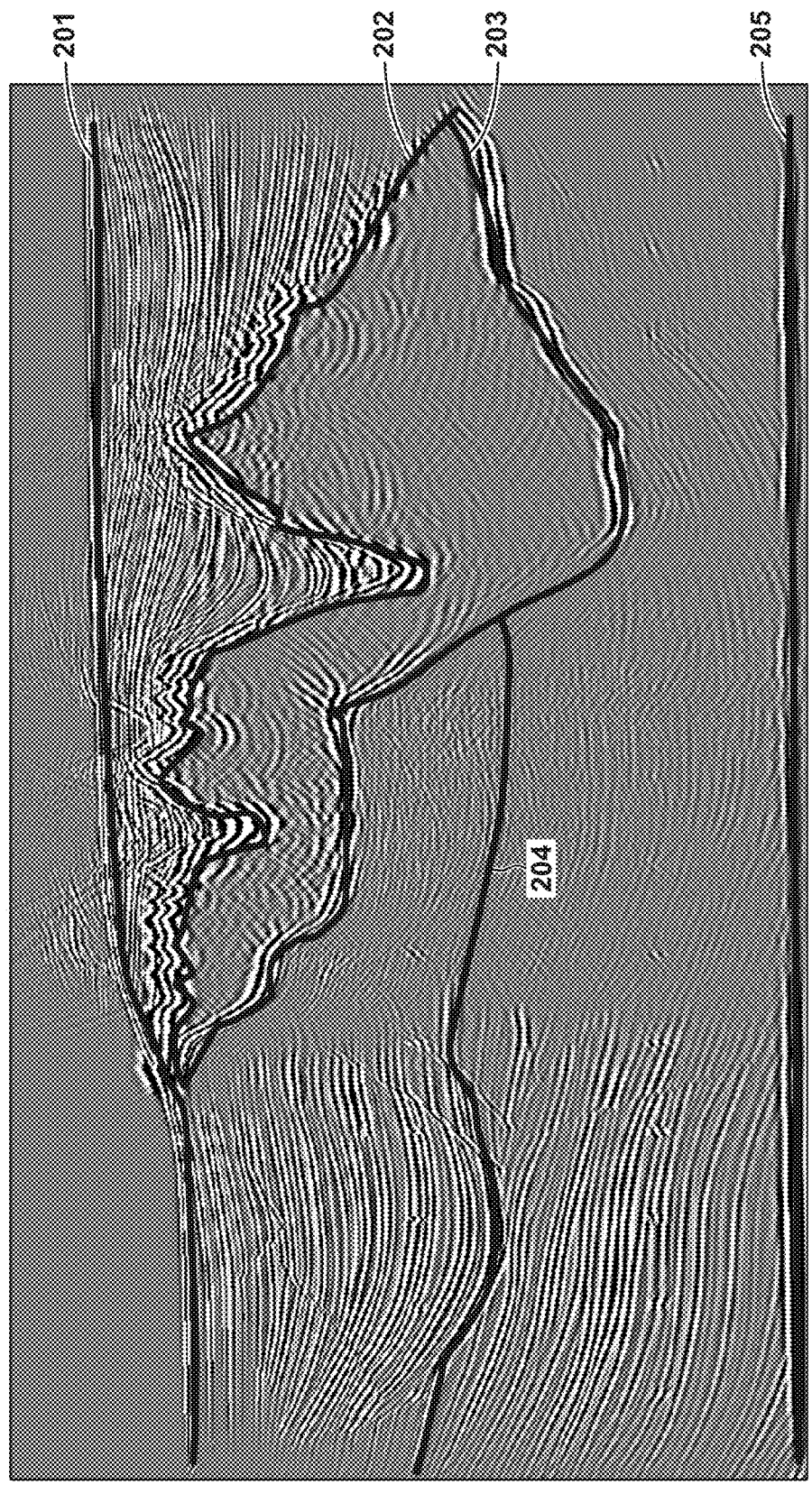
FIG. 2 illustrates a representation of a migrated image volume.

Seismic imaging aims to construct an image of geologic structures in the subsurface from reflection data recorded at or near the surface of the Earth or on/in water. For constructing such an image, one needs a physical property model for computing wave propagation in the subsurface. Conventional wave equation migration is performed by propagating data downward through a velocity model into the earth. RTM propagates events both downward and upward through an earth model (e.g., velocity model or other physical property model). While RTM is used in this example, other migration techniques (e.g. Kirchhoff migration or WEM) could be used. For example, FIG. 2 provides an exemplary inline of a Kirchhoff image overlaid by a velocity model in a narrow azimuth 3D dataset as an example representative of the generated image volume from step 101.

While not depicted in FIG. 1, step 101 can include additional processing of the RTM image stack with Laplacian filtering or denoising in order to condition the image volume for step 102.

In step 102, horizons or surfaces (an interface that might be represented by a seismic reflection, such as the contact between two bodies of rock having different seismic velocity, density, porosity, fluid content, or all of these) are selected or identified in the image domain. FIG. 2 shows examples of such horizons, with horizons 201, 202, 203, 204, and 205 identified as examples. Not every horizon or surface needs to be selected for use in this method. On the contrary, a few horizons can be selected. Those of ordinary skill in the art can determine an appropriate number of horizons that will balance accuracy and processing time (cost) for their particular applications. Potential horizons can include the water bottom (WB), top of salt (TOS), bottom of salt (BOS), or other geologic structures known to those of ordinary skill in the art. However, the present technological advancement is not limited to these particular horizons. Horizons can be interpreted manually or with the aid of software. Commericially available software (e.g., Petrel®) can perform automatic horizon selection.

Alternatively, step 102 can use a dip field generated as part of step 101 to populate a reflectivity model that has more horizons. However, prominent horizons such as water bottom (WB), top of salt (TOS), bottom of salt (BOS) can be included for accuracy of the method. The dip field can be calculated from the standard migration image from step 101 using conventional techniques. The number of reflectors in this more detailed reflectivity model can be controlled by the user. This alternative for selecting the horizons is more suited to being implemented automatically by a computer and does not involve too much human interpretation. For example, known computerized automatic painting or picking software can be used (e.g., Petrel®) for selecting the horizons.

In step 103, the interpreted horizons are used to generate density spikes or density blocks of the Earth model, which are in turn used with the velocity model from the migration work flow to simulate synthetic shot gathers substantially matching the recorded data acquisition geometry information. The data synthesis and migration can be performed at sparse shot locations and at low migration cost. Therefore, an attribute for a limited number of shots can be obtained at extremely low cost. However, the present technological advancement does not require sparser surface density and time sampling relative to the field dataset. The present technological advancement can be used with synthetic data generated with the same or substantially similar surface shot/source density and time sampling relative to the field dataset.

Alternatively to steps 102 and 103 together, a prestack demigration (ray based or wave based) procedure can be used to simulate a synthetic dataset without picking horizons. The demigration allows for automated data synthesis with desired acquisition geometry, as described in connection with steps 102 and 103. Unlike the combination of steps 102 and 103, this alternative does not require the creation of a reflectivity model based on a stacked seismic image. The input can be migrated shots from a standard workflow (step 101 in FIG. 1) and a macro-velocity model that is used for the standard workflow in step 101. This alternative is an inverse of migration, as discussed in reference 4. As stated in reference 4, "Demigration, on the other hand, although it may provide very similar results [as modeling], uses a conceptually different approach. The aim of demigration is to reconstruct a seismic time section out of a corresponding depth migrated section. In other words, demigration aims to invert the process of migration. Of course, as migration is based on the wave equation, also its inverse process, demigration, has to have its fundamentals in that equation. As opposed to modeling, however, in the demigration process, we do not have to know precisely all the parameters. Neither the true velocity distribution in the earth, nor the source wavelet, nor above all, the position of the interfaces has to be known in order to apply demigration. All that is needed is the macro-velocity model that has been used for the migration process which produced the migrated section. Of course, the better the macro-velocity model is, the better the will be the corresponding migrated section. This is, however, a problem of migration and not of demigration. Demigration will work without any restrictions, even if the model used for migration was very poor, if the same model is used for demigration."

The simulation can be determined using low frequency finite difference, a one-way wave equation or a two-way wave equation technique. The number of sparse shot locations can be determined by those of ordinary skill in the art by balancing processing cost vs. accuracy. While not necessarily required, the shots used for the simulation can coincide spatially with shots in the acquisition in order to minimize the amount of interpolation or extrapolation in determining the attribute.

In general, the dominant surface offset from a shot record contributing to an image location is a function of the shot location, the velocity model, and the reflector dip and azimuth. By going to the image domain and synthesizing new data, perhaps with a forward simulation method that omits surface-related multiples (finite difference or two-way wave equation could be used as such a simulation engine), the noise in the raw/original data is removed and the synthetic data for the attribute expectation estimate are regularized (i.e., having a regular acquisition geometry). One could even use ray-theory or one-way wave methods for simulation depending on the Earth model complexity.

Figure 3:
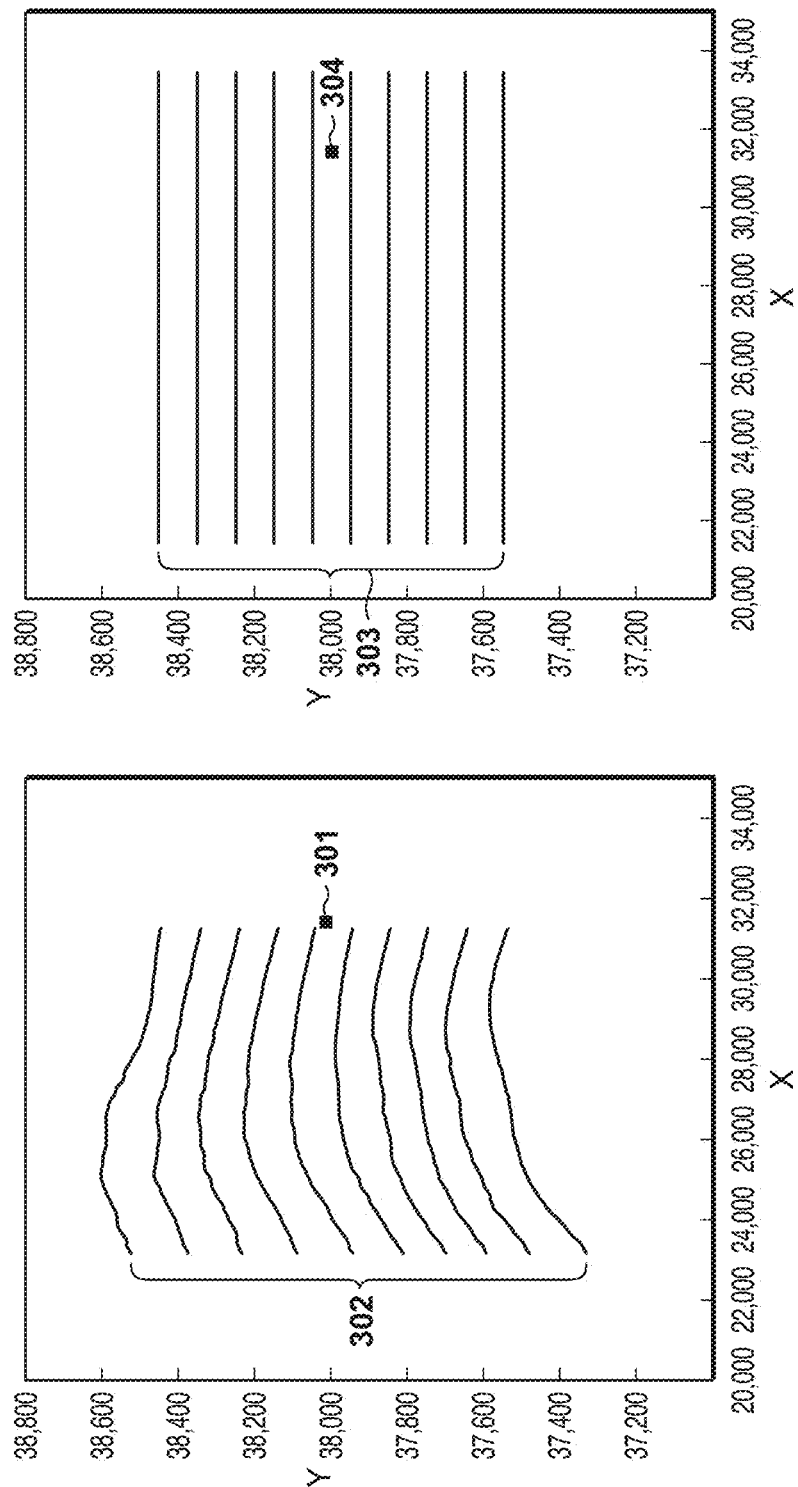
FIG. 3A illustrates shot and streamer locations for acquisition of raw field data.
FIG. 3B illustrates shot and streamer for the generation of regularized synthetic data.

FIG. 3A illustrates exemplary streamer 302 and shot 301 locations for raw field data, and FIG. 3B illustrates exemplary streamer 303 and shot 304 locations for regularized synthetic data. The use of the regularized acquisition geometry (e.g., FIG. 3B) improves accuracy of the attribute estimation and removes biases close to shot points and streamer edges. However, the present technological advancement is useable with both regular and irregular acquisition geometries. The streamers 303 in FIG. 3B have padded offsets in both the near and far end as compared with FIG. 2A. Thus, the acquisition area used to generate synthetic data can be the same, substantially similar, or wider than acquisition area used for the field dataset. By padding to a wider acquisition area, the estimated offset value is more accurate. This is because the expectation method uses the location of interest and its neighbors to estimate attributes, and since locations near the edge of the acquisition do not have neighbors from all directions, the estimated attribute is biased. Padding removes such biases.

In step 104, the synthetic data from step 103 is weighted by the desired attribute (surface offset, surface vector offsets, surface azimuth, positions of the receivers, or another seismic acquisition parameter). Each of the synthetic traces can be multiplied by the attribute or a function based on the attribute. If h is offset, and D is a synthetic trace, the modulated or weighted data D' can be equal to h*D, or f(h)*D, wherein f(h) is some function of h, such as 2 h, $h^2$ or some more complicated function of h.

Steps 105-107 are an exemplary application of the expectation method. In step 105, migration (e.g., Kirchhoff migration, shot-domain Gaussian beam, shot-profile wavefield extrapolation migration (WEM), or shot-profile RTM) is applied to the synthetic data generated in step 103, which results in an image volume. In step 106, migration is also applied to the weighted synthetic data generated in step 104, which results in another image volume (an attribute weighted image volume). In step 107, the results of step 105 and the results of step 106 are subject to a division process, which results in an image volume with attribute values for each shot. A raw division of the results of step 105 with the results of step 106 may give rise to stability issues. Alternatively, the division process could be cast as set of local least square problems.

In step 108, for shots that correspond to real acquisition locations, the attribute volume from step 107 is interpolated (a 5-D volume) to obtain an attribute volume for all shots that were included in the acquisition of the raw field data. The RTM shot images (from the original RTM runs, see step 101) can be mapped (shot by shot) to appropriate bins (i.e., sub-groups of different offset ranges or, more generally, a range of values for an attribute) using the attribute or offset volume from step 107. By mapping, the present technological advancement is essentially adding an additional dimension (i.e., the attribute) to the RTM image (i.e., an x, y, z, for the RTM image become x, y, z, h, wherein h is the attribute).

For a specific position (x, y, z) in the pre-stack migrated image from step 101, there is a particular value for reflectivity R. In the same position in the volume generated in step 107, possibly after interpolation), the value of the attribute h is at the specific position (x, y, z). With the five data values (the 5-D volume), migrated offsets can be generated.

Figure 4:
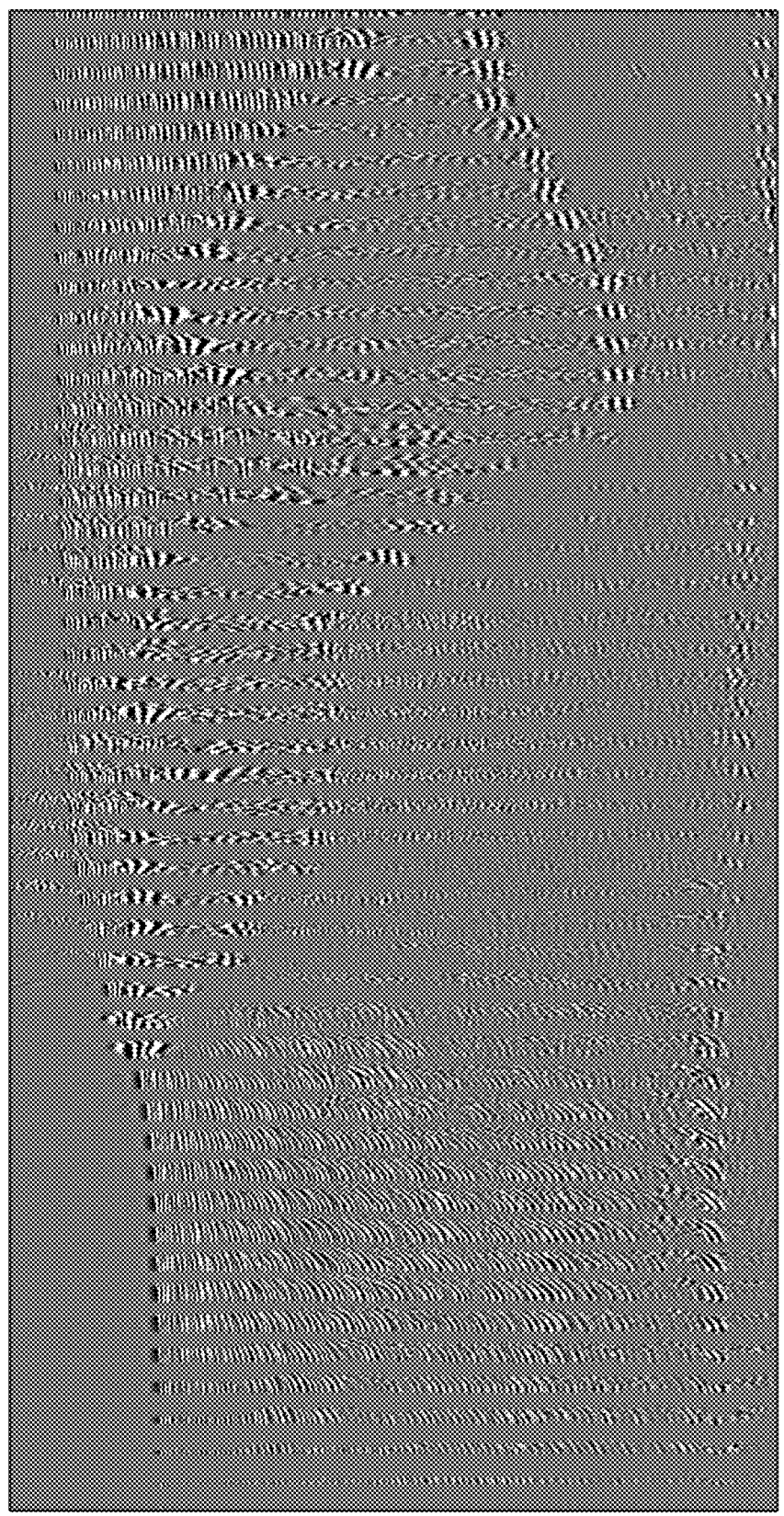
FIG. 4 illustrates an example of surface offset gathers.

In step 109, the mapped RTM shot images are stacked to obtain attribute gathers for the entire survey area. An example of surface offset gathers for sparse crossline locations across one inline of a seismic survey is shown in FIG. 4. The gathers here indicate the migration velocity is too slow. In this example, a low-frequency, course-grid RTM was performed for the surface-offset calculation. The raw data was migrated with higher frequency and finer grids to preserve image and gather resolution. The overall added cost to computer RTM surface offset gathers was this example is much less than one RTM.

The present technological advancement can utilize isolated wave packet events, for which the expectation method is more accurate. Conventional uses of the expectation method (see reference 2) suffer from errors caused by multiple events in a window.

The present technological advancements use of synthetic data provides for regularized data, which can have a larger acquisition patch than the original field data. The synthetic data can be computed with small-offset and large-offset data, and with a good aperture to mitigate any bias of expectation as a function of offset. There is no need for shot-domain data regularization, which is very costly; especially for wide-azimuth (WAZ) data.

The present technological advancements use of synthetic data, generated with a forward simulation method that omits surface-related multiples, prevents the present technological advancement from being compromised by noise in the field data.

The present technological advancement can use a low-frequency simulation on a coarsely-sampled model at low cost. The present technological advancement can quickly obtain attributes that vary slowly as function of space. For moderately complex geology, Kirchhoff depth migration can be used as the migration engine (steps 105 and 106) to generate the attribute estimates (step 107). For RTM suitable areas, RTM can be used as noted in FIG. 1, but with very low frequency runs that are sufficient to obtain the low-wavenumber attributes.

The present technological advancement can generate a separate data attribute volume (slowly varying with space) from synthetic seismic data (quickly varying with space) by using only a few horizons. In this way, the present technological advancement generates synthetic data with reduced complexity (relative to the field data as there are no multiple reflections or event crossings) and guarantees a single-valued attribute estimate. The attributed volume computed from low-frequency simulation can be efficiently interpolated.

Since the original migrated image (step 101) is mapped to the attribute image, the present technological advancement does not modify amplitudes, amplitude vs. offset (AVO), or amplitude vs. angle (AVA) behavior; even if a different reflectivity model is used from a true Earth model.

In the present technological advancement, synthetic simulation/migration can also define amplitude/phase compensation operators. Reflectivity model from Step 102 can be convolved with an ideal seismic wavelet and produce a so-called convolution model. This convolution model is an ideal seismic volume that can be used together with a stack of shot images in step 105, a seismic volume that bears the seismic imaging(migration operator) responses, to derive amplitude/phase compensation operators that can be applied to field data seismic volume (RTM image stack from step 101) for more faithful amplitude and phases.

With the present technological advancement, it is easier to recompute an attribute without redoing the RTM or other migration process on the field data if subsequent iterations select better horizons or generate improved synthetic data.

The present technological advancement can be used to manage hydrocarbon production. The subsurface images from the migration and the attribute gathers generated by the present technological advancement can be used to explore for hydrocarbons and improve geophysical prospecting. For example, the flatness of the offset gathers can be used to judge the accuracy of the velocity model, and with an improved velocity model (which can be carried out by velocity tomography or velocity scanning, aiming for flatter offset gathers) more accurate subsurface images can be generated. More accurate subsurface images serve as key element in de-risking in the process of identifying hydrocarbon plays, leads, prospects and quantifying reservoir volumes, etc. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

Figure 5:
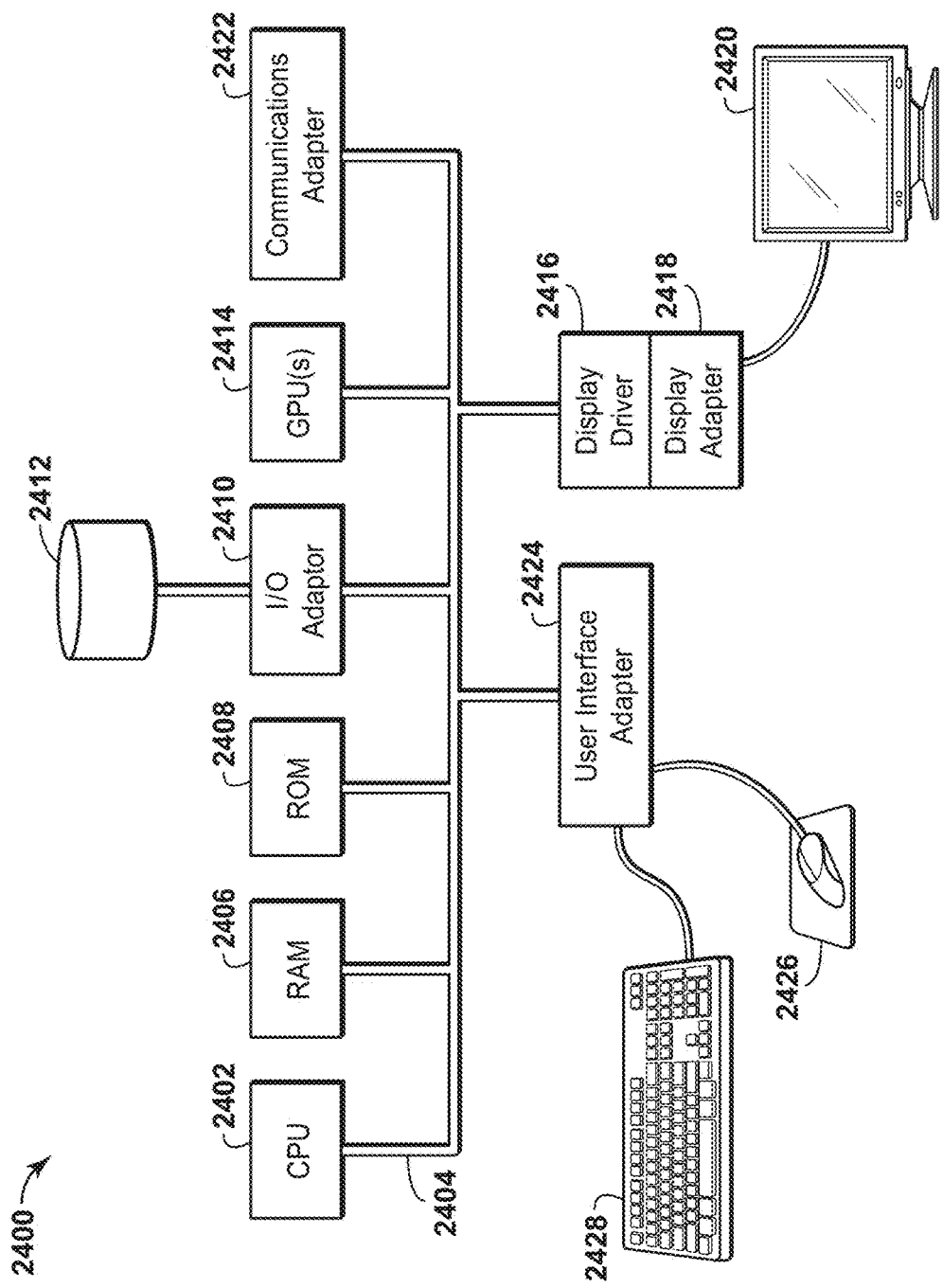
FIG. 5 illustrates an example of a computer system useable with the present technological advancement.

FIG. 5 is a block diagram of a computer system 2400 that can be used to execute the present techniques. A central processing unit (CPU) 2402 is coupled to system bus 2404. The CPU 2402 may be any general-purpose CPU, although other types of architectures of CPU 2402 (or other components of exemplary system 2400) may be used as long as CPU 2402 (and other components of system 2400) supports the operations as described herein. Those of ordinary skill in the art will appreciate that, while only a single CPU 2402 is shown in FIG. 5, additional CPUs may be present. Moreover, the computer system 2400 may comprise a networked, multi-processor computer system that may include a hybrid parallel CPU/GPU 2414 system. The CPU 2402 may execute the various logical instructions according to various teachings disclosed herein. For example, the CPU 2402 may execute machine-level instructions for performing processing according to the operational flow described.

The computer system 2400 may also include computer components such as nontransitory, computer-readable media. Examples of computer-readable media include a random access memory (RAM) 2406, which may be SRAM, DRAM, SDRAM, or the like. The computer system 2400 may also include additional non-transitory, computer-readable media such as a read-only memory (ROM) 2408, which may be PROM, EPROM, EEPROM, or the like. RAM 2406 and ROM 2408 hold user and system data and programs, as is known in the art. The computer system 2400 may also include an input/output (I/O) adapter 2410, a GPU(s) 2414, a communications adapter 2422, a user interface adapter 2424, a display driver 2416, and a display adapter 2418.

The I/O adapter 2410 may connect additional non-transitory, computer-readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with the present techniques. Further, user interface adapter 2424 couples user input devices, such as a keyboard 2428, a pointing device 2426 and/or output devices to the computer system 2400. The display adapter 2418 is driven by the CPU 2402 to control the display driver 2416 and the display on a display device 2420 to, for example, present information to the user regarding available plug-ins.

The architecture of system 2400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 2400 may include various plug-ins and library files. Input data may additionally include configuration information.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

What is claimed is:

1. A method for generating seismic attribute gathers, the method comprising:
   computing, with a computer, seismic images with a field dataset;
   generating, with a computer, synthetic data corresponding to the seismic images, using a forward simulation method that omits surface-related multiples;
   computing, with a computer, an attribute volume by applying an expectation method to the synthetic data, wherein applying the expectation method to the synthetic data comprises;
   applying a migration process to the synthetic data to generate a subsurface image volume;
   applying a migration process to the synthetic data, wherein seismic traces of the synthetic data are weighted by multiplying the seismic traces by a function of a value of an attribute, and generating an attribute weighted subsurface image volume; and computing the attribute volume by applying a division process to the subsurface image volume and the attribute weighted subsurface image volume;

mapping, with a computer, the attribute volume to the seismic images; and generating, with a computer, seismic attribute gathers by stacking the seismic images mapped to the attribute volume.

2. The method of claim 1, wherein the computing seismic images further comprises:

dividing the field dataset into bins, wherein binned data have similar values of an attribute;

performing seismic imaging for the binned data using a known Earth model and one of Kirchhoff migration, one-way wave equation migration, or reverse time migration; and forming a subsurface Earth image by summing outputs from the seismic imaging of the binned data.

3. The method of claim 2, wherein the attribute is surface offset.

4. The method of claim 1, wherein the synthetic data is generated using a reflectivity model.

5. The method of claim 4, wherein the reflectivity model is generated using seismic interpretation software.

6. The method of claim 4, wherein the reflectivity model is generated by a computerized painting or picking program.

7. The method of claim 6, wherein the method includes using a dip field to populate the reflectivity model.

8. The method of claim 1, wherein the synthetic data is generated using a prestack demigration process.

9. The method of claim 1, wherein the synthetic data is based on an acquisition geometry substantially similar to that of the field dataset set in both surface density and time sampling.

10. The method of claim 1, wherein the synthetic data has a sparser surface acquisition geometry and time sampling than the field dataset.

11. The method of claim 1, wherein the synthetic data has a regular acquisition pattern.

12. The method of claim 1, wherein the synthetic data has an irregular acquisition pattern.

13. The method of claim 1, wherein the synthetic data has a substantially similar acquisition area relative to the field dataset.

14. The method of claim 1, wherein the synthetic data has a wider acquisition area relative to the field dataset.

15. The method of claim 1, wherein the mapping the seismic images to bins using the attribute volume, wherein the bins define attribute values.

16. The method of claim 1, further comprising using the seismic attribute gathers to improve a velocity model, using the improved velocity model to generate a subsurface image, and extracting hydrocarbons from a location determined at least in part from the subsurface image.

* * * * *